Feb. 17, 1953 W. C. LINCOLN 2,628,807
VISOR BRACKET
Filed June 25, 1947
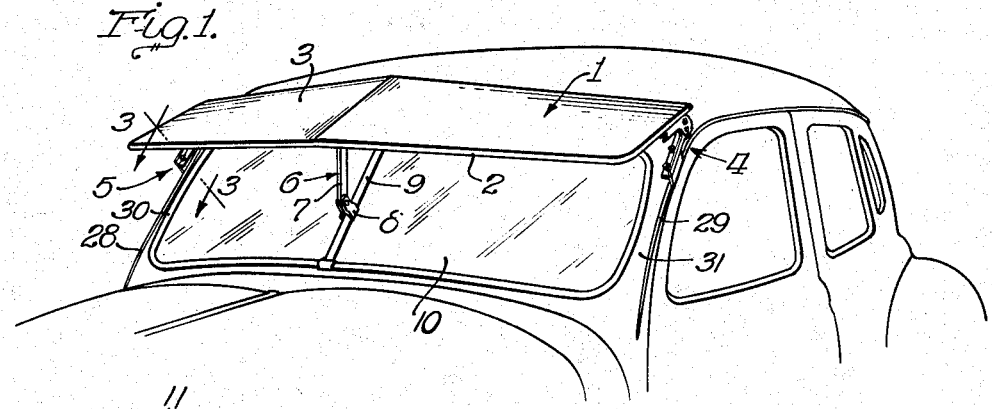
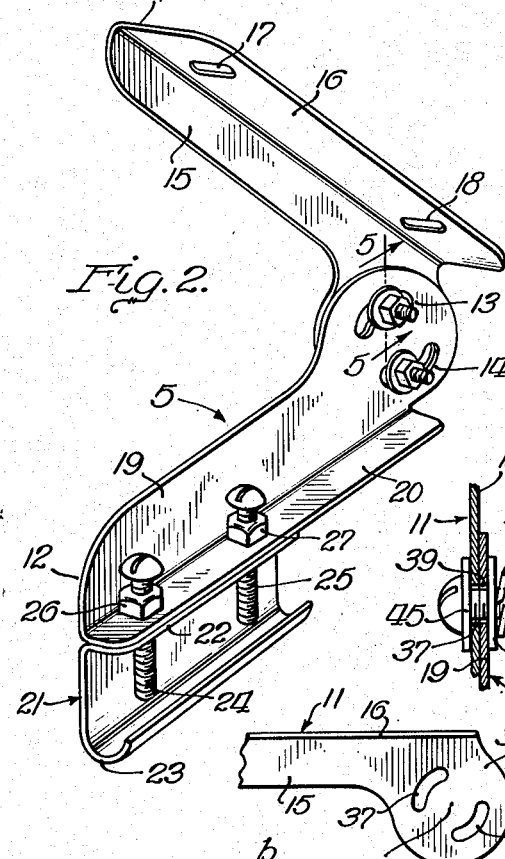
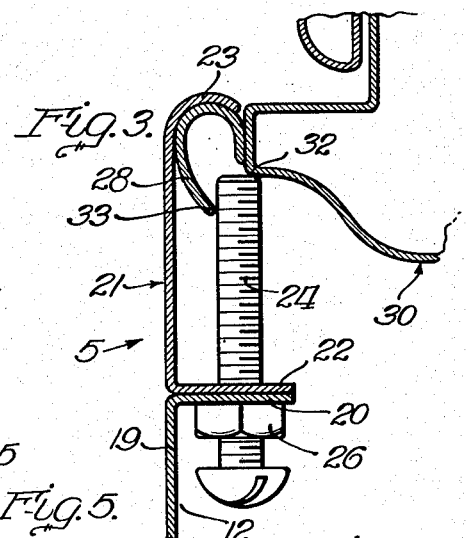
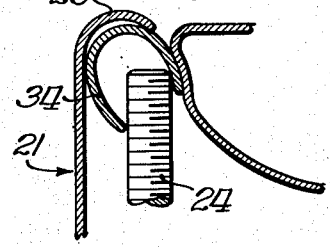
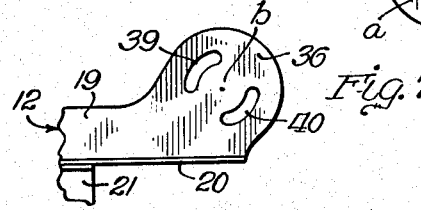
INVENTOR.
Wilbur C. Lincoln
BY
Eberhard E. Wettley
Atty.

Patented Feb. 17, 1953

2,628,807

UNITED STATES PATENT OFFICE 2,628,807

VISOR BRACKET

Wilbur C. Lincoln, Chicago, Ill., assignor, by mesne assignments, to Dieterich Products Corporation, Michigan City, Ind., a corporation of Illinois Application June 25, 1947, Serial No. 756,907

6 Claims. (Cl. 248—226)

This invention relates to an automobile visor and more specifically to the bracket construction therefor which incorporates certain new and novel features producing an economical and practical arrangement.

One of the main objections in the past to visors of this type has been the procedure required to secure them into position over the windshield of an automobile. The services of a trained mechanic are required to spot and drill the necessary holes to accommodate the fastening screws or bolts, or other special work was necessary to attach adapters to receive the brackets supporting the visor.

One of the main objects of the present invention is to provide a visor having brackets that may be secured to an automobile body without the aid of a trained mechanic and without the use of special tools or drills. The visor is made for direct and simple attachment to the car body by any person through the use of the very simplest of common tools. Further, no holes or other changes need be made to receive the brackets to that subsequent removal of the visor for short or long intervals of time, or for any reason whatsoever, will not affect the normal appearance of the front or corner posts of the body of the car. In transferring ownership of a car, the visor may be readily changed to the new vehicle without defacement of the vehicle from which the same was removed.

Another object of the invention is to provide a bracket having a hinge structure arranged for anti-frictional adjustment to change the inclination of the visor to suit conditions of use, the hinge having the facility to retain such visor as adjusted under all normal driving conditions.

All other objects and advantages relating to the visor brackets of the present invention shall hereinafter appear in the following detailed description having reference to the accompanying drawings forming a part of this specification.

In the drawings:

Fig. 1 is a general perspective view of a conventional automobile illustrating the visor shade attached by means of the brackets of the present invention;

Fig. 2 is another perspective view of the visor shade bracket which in this instance represents the left-hand bracket of the Fig. 1 construction and as the same is seen from the inner face thereof;

Fig. 3 is a transverse cross sectional view on an enlarged scale substantially as taken along the line 3—3 in Fig. 1 illustrating the attachment of the bracket to the corner post or forward panel portion of the automobile which flanks the windshield of the car;

Fig. 4 is another detail cross sectional view similar to Fig. 3 but illustrating how the same attaching means of the bracket may be positioned in other car constructions wherein certain details of the rain gutter arrangement have been varied;

Fig. 5 is a fragmentary vertical cross sectional view of one of the frictional hinge units substantially as seen along the line 5—5 in Fig. 2; and Figs. 6 and 7 are each fragmentary views of the hinge portions of the two relatively movable bracket arms and as the same would appear without the frictional connecting means that are illustrated in Fig. 5.

The general visor construction comprises a visor shade 1 having a generally formed and arranged interior framework forming a peripheral support 2 over which an envelope of water-proof fabric 3, or other suitable covering which has been properly treated or prepared, may be stretched and secured into place to produce a single unitary airfoil of proper dimensions and design to fulfill the function of shading the occupants of the car.

This visor 1 is supported by means of the brackets 4 and 5 attached at each side of the car and it is preferable to provide a center bracket 6 having a brace 7 connected with the visor shade 1 and having a suitable clamp 8 of conventional bifurcated construction which may be used for grasping the opposite sides of the center bar 9 of the windshield 10.

Since each of the brackets 4 and 5 are of like construction with the exception that the same are made left and right hand units to occupy similar and corresponding sides of an automobile in supporting the visor shade 1, the bracket 5 illustrated in Fig. 2 will be described in detail to present the salient features of the invention inherently contained in the specific construction of bracket shown.

Bracket 5 primarily includes two main elements comprising the visor arm 11 and the supporting arm 12 which are connected for relative movement in a novel hinge arrangement which includes the frictional securing means 13 and 14 hereinafter to be described in detail. It suffices to say that the arms 11 and 12 are adapted for relative swinging movement about a common rotational point for the purpose of adjusting the angularity of the visor shade with respect to the windshield and forward portion of the car body.

The visor arm 11 is preferably made as an angular unit having a vertical leg 15 with leg 16 laterally disposed with respect thereto and having suitable openings 17 and 18 therein to permit screws, bolts, or other fastening devices to be secured through such openings 17 and 18 for connection with the visor frame 2 so that arm 11 and the visor are in rigid and fixed union for bodily swinging about the general axis of the hinge of the entire visor bracket.

The supporting arm 12 is also provided with a vertical leg 19 having a lateral leg 20 to also present an angle construction which is inverted, however, with respect to the legs 15 and 16 of the visor arm 11. The visor supporting arm 12 is provided with a depending bracket 21 which has its outer surface portion disposed generally in the same plane as the vertical leg 19 of the supporting arm 12. This bracket 21 is provided with a lateral leg 22 for the purpose of securing such bracket to the adjacent lateral leg 20 of the supporting bracket 12 in any suitable desirable fashion. In the present construction the leg 22 is joined to the leg 20 through soldering or brazing so that the bracket 21 becomes an integral portion of the supporting arm 12. The outer remote end of the bracket 21 is shaped to provide a hook channel 23 that is preferably made to extend the length of the bracket 21 although it need not be continuous.

The pair of lateral legs 20 and 22 are suitably drilled and tapped to receive screws 24 and 25, and each of these screws is provided with lock nuts such as 26 and 27 respectively.

The vertical locations of the screws 24 and 25 are such with respect to the position of the channel 23 as to provide a means for securing the visor supporting arm 12 to the rain gutter portion of a conventional automobile. As seen in Fig. 1, the sides of the car are provided with rain gutters 28 and 29 which extend along each side of the car top and then forwardly and downwardly along each of the corner posts 30 and 31 of the car.

Referring now to Fig. 3, the bracket 5 is fragmentarily illustrated and shown in clamped or attached relation with respect to the adjacent portion of the car. Here it is seen that the bracket 21 is positioned in a general vertical plane with the hook channel 23 engaging about the rounded portion of the rain gutter 28 and with the screw 24 being disposed adjacent the open side of the rain gutter 28 and preferably in contact with the edge thereof and abutting against a part of the corner post 30 substantially at a point 32. It should also be noted that the screw 24, by being properly spaced with respect to the wall of the bracket 21, is adapted for having partial engagement at 33 with the outer open edge portion of the rain gutter 28 to produce a stabilizing feature which normally contributes to hold the entire bracket in its fixed and attached position after the same has been applied and fastened to the automobile in the manner shown in Fig. 3.

In some constructions the rain gutter may be wider and more open as shown at 34 in Fig. 4 and in such instances the screw 24 may be positioned to enter directly a part of or the entire gutter as the case may be for securing the bracket 21 of the visor supporting arm 12 in fixed relationship with respect to the adjacent and adjoining portion of the corner post of an automobile.

As stated before, lateral stability is obtained by the location of the screws 24 and 25 with respect to the open portion of the hook channel 23 so that the screws may engage or be situated immediately adjacent the open edge portion of the rain gutter 28 or 34 thereby counteracting any rotational movement of this unit with respect to and about the longitudinal axis of the rain gutter. Obviously, such movement is also prevented through the visor shade which spans the car front from the bracket 4 to the bracket 5. Likewise, the use of two screws such as 24 and 25 further enhances the stability of the bracket although it is also contemplated using a single central screw or other single attaching means equivalent to said screw for the purpose of attaching the bracket 21 of the visor supporting arm 12 to the rain gutter or other equivalent portion of an automobile body.

Referring now to Figs. 6 and 7, each of the arms 11 and 12 are provided with generally circular ears 35 and 36 which are enlarged portions of the vertical legs 15 and 19 of such arms. In addition, each of the ears 35 and 36 are provided with elongated and concentrically arranged openings such as 37 and 38 in ear 35, and 39 and 40 in ear 36. When the two arms 11 and 12 of the brackets are placed with ears 35 and 36 in adjacent contacting position, the openings 37—38 and 39—40 will be generally disposed in coincident relation when these brackets are joined with the legs 16 and 20 being in general parallel relationship. When so disposed, each of the pairs of openings 37—39, and the corresponding pairs of openings 38—40 are adapted for receiving the frictional hinge units 13 and 14 which are identical and best illustrated by reference to Fig. 5.

Each of the hinge units 13 and 14 comprises a frictional screw arrangement including a screw 41 having a nut 42 engaging a spring washer 43 which is normally urged against a washer 44 disposed adjacent the leg 19 of the ear 36 of the supporting arm 12 and another washer 45 is confined between the head of the screw 41 and the adjacent surface of the vertical leg 15 of the arm 11. By properly tensioning the nut 42 it is an easy factor to control the frictional resistance encountered at the hinge fastening points and obviously the spring washer 43 will act to prevent the nut 42 from turning loose under most normal adjusted operating conditions.

Obviously, both of the fastening units are concentrically located so that each of the arms 11 and 12 are swingable and adjustably movable with respect to each other about the virtual axial center points $a$ and $b$ indicated in Figs. 6 and 7. Thus, in attaching the visor 1 to the forward portion of a car and above the windshield thereof, the brackets 4 and 5 may be adjusted to the proper angular relationship by making the angular adjustment at the frictional hinge assemblies and by then securing the center bracket 6 in proper relationship with respect to the center bar 9 of the windshield 10. It should be understood that the bracket 6 may be optionally used depending upon conditions of operation and other variable factors. However, with the suitable and large enough frictional units of the kind shown in Fig. 5 and with two or more of such units, it is possible to tighten the arms 11 and 12 into selected positions which will normally withstand any loosening of the visor during the operation of the car. In this respect, it should also be noted that the screw 41 might be replaced with a wing nut for hand manipulation which is an obvious expedient and which may be desirable and more useful when the brackets such as 4 and 5 are being utilized to solely support the visor from the lateral edges or corner posts of the automobile body, and with the center or other brace such as 6 not in use which has normally only the function of adding stability to the forward central portion of the visor to prevent fluttering and other noisy conditions.

The frictional hinge units 13 and 14 are placed in off-center relation with respect to a virtual axis that intersects points a and b. This arrangement distributes the frictional forces at points away from the center of rotation of the bracket arms 11 and 12 causing better frictional contact between ears 35 and 36 and at areas that are much more effective in resisting rotation or change of angularities between the arms.

Certain changes and modifications in the exact construction of visor bracket disclosed and described are contemplated in the bracket of this invention. Also, the substitution of equivalent elements and mechanisms are contemplated to promote the inherent features and to fulfill the purposes for which this bracket has been provided. All such changes and modifications as well as substitution of equivalent elements shall be governed by the breadth and scope of the claims directed to this invention and appended hereto.

What I claim is:

1. In apparatus of the class described comprising an automobile windshield shade adapted to be positioned in shielding relationship to the windshield of an automobile having gutters alongside the windshield, means for securing the shade to the gutters comprising a channel member secured to opposite ends of the shade adjacent opposite gutters, each channel member having relatively parallel upper and lower walls on opposite sides of the associated gutter, and a connecting perpendicular wall, the lower wall being curved and adapted to hook under said associated gutter, the upper wall having screw means engaged therewith and passing through same downwardly and into the top of said associated gutter, and clamping said channel member to said gutter.

2. Channel members as described in claim 1 in which the said channel members have means providing limited pivotal securement of the ends of the shade thereto.

3. Channel members as described in claim 1 in which the lower walls each consist of a continuous hook channel coextensive with the width of said perpendicular wall adapted to engage beneath and around the outside of said gutter.

4. In apparatus of the class described comprising an automobile visor adapted to be positioned in shading relationship to the windshield of an automobile body, said body including gutters alongside the windshield, means for securing the visor to the gutters comprising a bracket secured to opposite ends of the visor adjacent opposite gutters, each bracket having hook means to embrace beneath an outside portion of said gutter, and adjustable screw means connected with said bracket and having at least one element adapted for movement toward and away from said hook means and adapted to engage a portion of said body to urge said gutter embracing means into tight engagement with the outside of the gutter, said element being offset from the bracket for side contact with the free edge of the rain gutter to counteract rotative motion between the bracket and hook upon said gutter.

5. In apparatus of the class described comprising an automobile windshield shade adapted to be positioned in shielding relationship to the windshield of an automobile having gutters alongside the windshield, means for securing the shade to the gutters comprising a channel member secured to opposite ends of the shade adjacent opposite gutters, each channel member having relatively parallel upper and lower walls on opposite sides of the associated gutter, and a connecting perpendicular wall, the lower wall being curved and adapted to hook under said associated gutter, the upper wall having screw means engaged therewith and passing through same downwardly and into the top of said associated gutter, and clamping said channel member to said gutter, said screw means having contact with the free edge of the gutter to counteract rotative motion between the bracket and the gutter.

6. In apparatus of the class described comprising an automobile visor adapted to be positioned in shading relationship to the windshield of an automobile body, said body including gutters alongside the windshield, means for securing the visor to the gutters comprising a bracket secured to opposite ends of the visor adjacent opposite gutters, each bracket having hook means to embrace beneath an outside portion of said gutter, and adjustable screw means connected with said bracket and having at least one element adapted for movement toward and away from said hook means and adapted to engage a portion of said body to urge said gutter embracing means into tight engagement with the outside of the gutter, said element being offset from the bracket for side contact with the free edge of the rain gutter to counteract rotative motion between the bracket and hook upon said gutter, each bracket having relatively parallel upper and lower walls on opposite sides of the associated gutter, and a connecting perpendicular wall, said hook means being formed by said lower wall and said upper wall having said screw means engaged therewith and passing therethrough.

WILBUR C. LINCOLN.

REFERENCES CITED

The following references are of record in the file of this patent:

UNITED STATES PATENTS

| Number | Name | Date |
| --- | --- | --- |
| D. 156,373 | Ross | Dec. 6, 1949 |
| 1,149,977 | Gow | Aug. 10, 1915 |
| 1,306,626 | Redmond | June 10, 1919 |
| 1,394,254 | Damon | Oct. 18, 1921 |
| 1,445,918 | Sterling | Feb. 20, 1923 |
| 1,498,524 | Gage | June 17, 1924 |
| 1,604,694 | Hein | Oct. 26, 1926 |
| 1,733,007 | Dahl | Oct. 22, 1929 |
| 1,860,073 | Brewster | May 24, 1932 |
| 1,864,943 | Riddle | June 28, 1932 |
| 2,253,353 | Sharp | Aug. 19, 1941 |
| 2,342,625 | Brooks | Feb. 29, 1944 |
| 2,424,222 | Brown et al. | July 22, 1947 |
| 2,447,246 | Groboski | Aug. 17, 1948 |